(12) United States Patent
Guo

(10) Patent No.: US 8,332,001 B2
(45) Date of Patent: Dec. 11, 2012

(54) SLIDING MECHANISM AND PORTABLE ELECTRONIC DEVICE USING THE SAME

(75) Inventor: Jing-Zhen Guo, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 305 days.

(21) Appl. No.: 12/836,671

(22) Filed: Jul. 15, 2010

(65) Prior Publication Data

US 2011/0165914 A1 Jul. 7, 2011

(30) Foreign Application Priority Data

Jan. 6, 2010 (CN) .......................... 2010 1 0300064

(51) Int. Cl.
*H04M 1/00* (2006.01)
(52) U.S. Cl. ...................... 455/575.4; 455/575.1; 16/239
(58) Field of Classification Search ............... 455/575.1, 455/575.3, 575.4; D14/138 AA–138 AD; 16/44, 239, 360, 361
See application file for complete search history.

(56) References Cited

U.S. PATENT DOCUMENTS

| | | | | |
|---|---|---|---|---|
| 2008/0032637 A1* | 2/2008 | Ladouceur et al. | ........... | 455/90.3 |
| 2010/0035668 A1* | 2/2010 | Lee | .............................. | 455/575.4 |
| 2010/0271770 A1* | 10/2010 | Sellers | ...................... | 361/679.08 |
| 2011/0003624 A1* | 1/2011 | Jung et al. | ................... | 455/575.4 |

* cited by examiner

*Primary Examiner* — George Eng
*Assistant Examiner* — Marcus Hammonds
(74) *Attorney, Agent, or Firm* — Altis Law Group, Inc.

(57) ABSTRACT

A sliding mechanism and a portable electronic device using the same are disclosed. The sliding mechanism includes a base plate, a siding plate, a connecting plate and a support plate. The sliding plate is slidably assembled with the base plate and located upon the base plate. The connecting plate is hinged to the sliding plate and configured to be located above the corresponding sliding plate when in a closed configuration or be rotated to form an angle with the sliding plate. The support plate with two ends thereof rotatably couple with the connecting plate and the base plate. The support plate is configured to be operably laid on the base plate in a closed configuration or form an angle with the base plate to support the corresponding connecting plate.

11 Claims, 5 Drawing Sheets

SLIDING MECHANISM AND PORTABLE ELECTRONIC DEVICE USING THE SAME

BACKGROUND

1. Technical Field

This disclosure generally relates to sliding mechanisms, particularly to a sliding mechanism and a portable electronic device using the same.

2. Description of Related Art

Conventional portable electronic devices can be classified into three different categories, bar-type devices, rotating-type devices, and sliding-type devices.

All three types of these electronic devices have the same following problems. When a user wants to watch a display of the electronic device that is resting on a table, it is required to use external support to hold the electronic device in a tilted position to give the display a better viewing angle. Alternatively, the user may hold the electronic device with his hands to get the proper viewing angle. However, this may become uncomfortable after a long time of viewing.

Therefore, there is room for improvement within the art.

BRIEF DESCRIPTION OF THE DRAWINGS

Many aspects of the embodiments of a sliding mechanism and a portable electronic device using the sliding mechanism can be better understood with reference to the following drawings. The components in the drawings are not necessarily drawn to scale, the emphasis instead being placed upon clearly illustrating the principles of the sliding mechanism and the portable electronic device. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
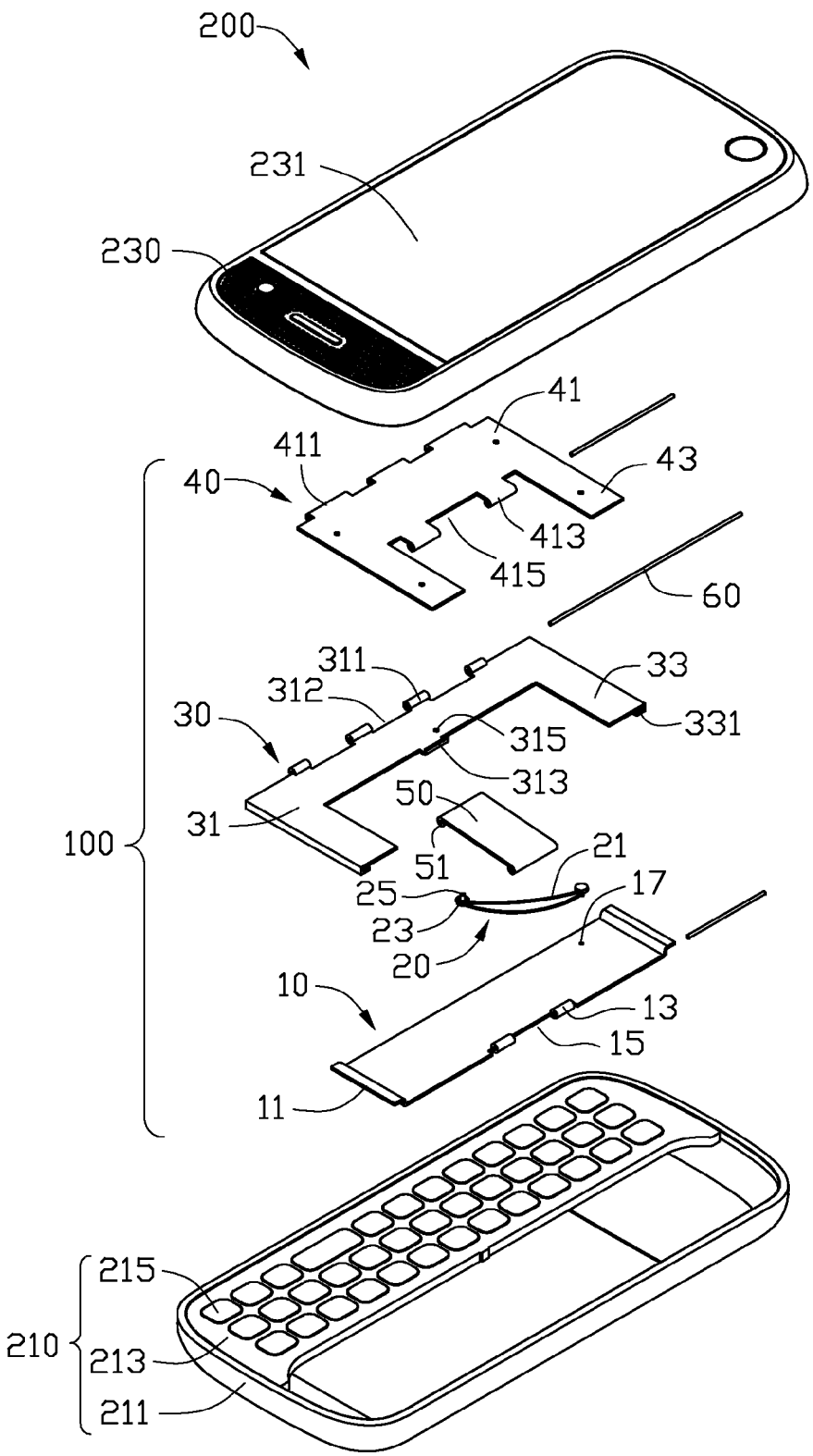
FIG. 1 shows an exploded view of a portable electronic device using a sliding mechanism according to an exemplary embodiment.
Figure 3:
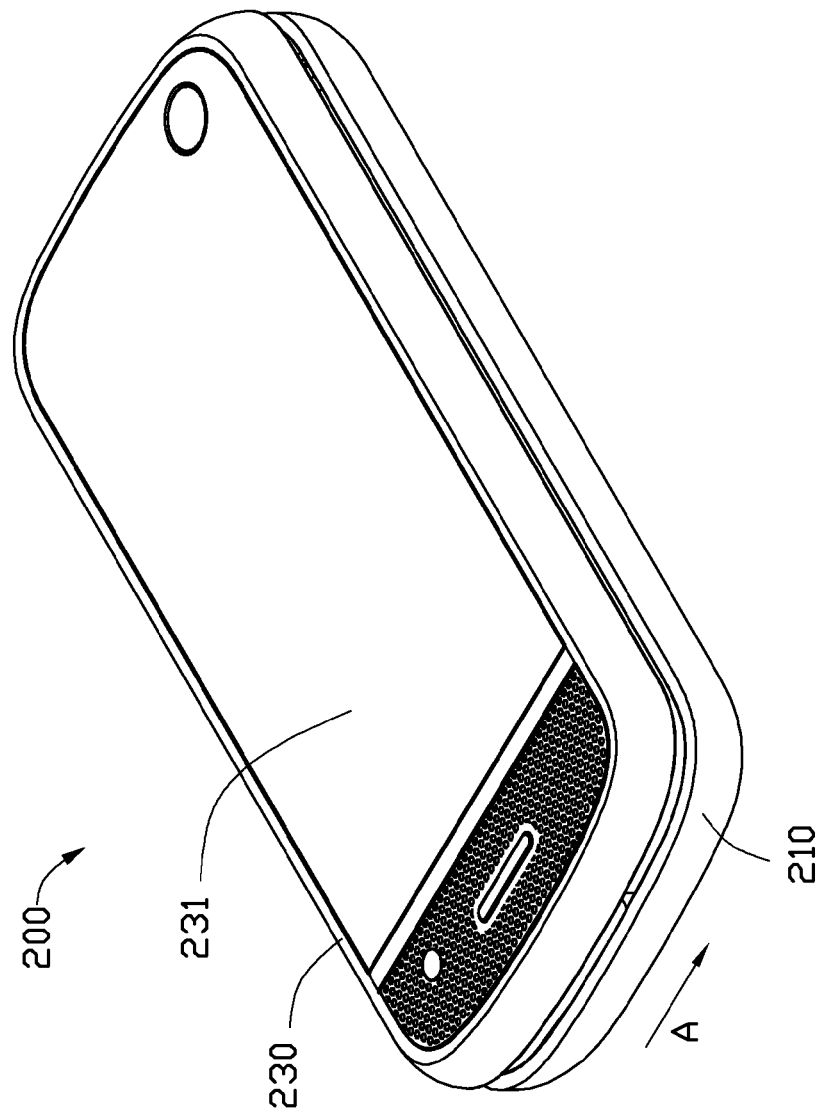
FIG. 3 shows an assembled perspective view of the portable electronic device shown in FIG. 1, in a closed configuration.
Figure 4:
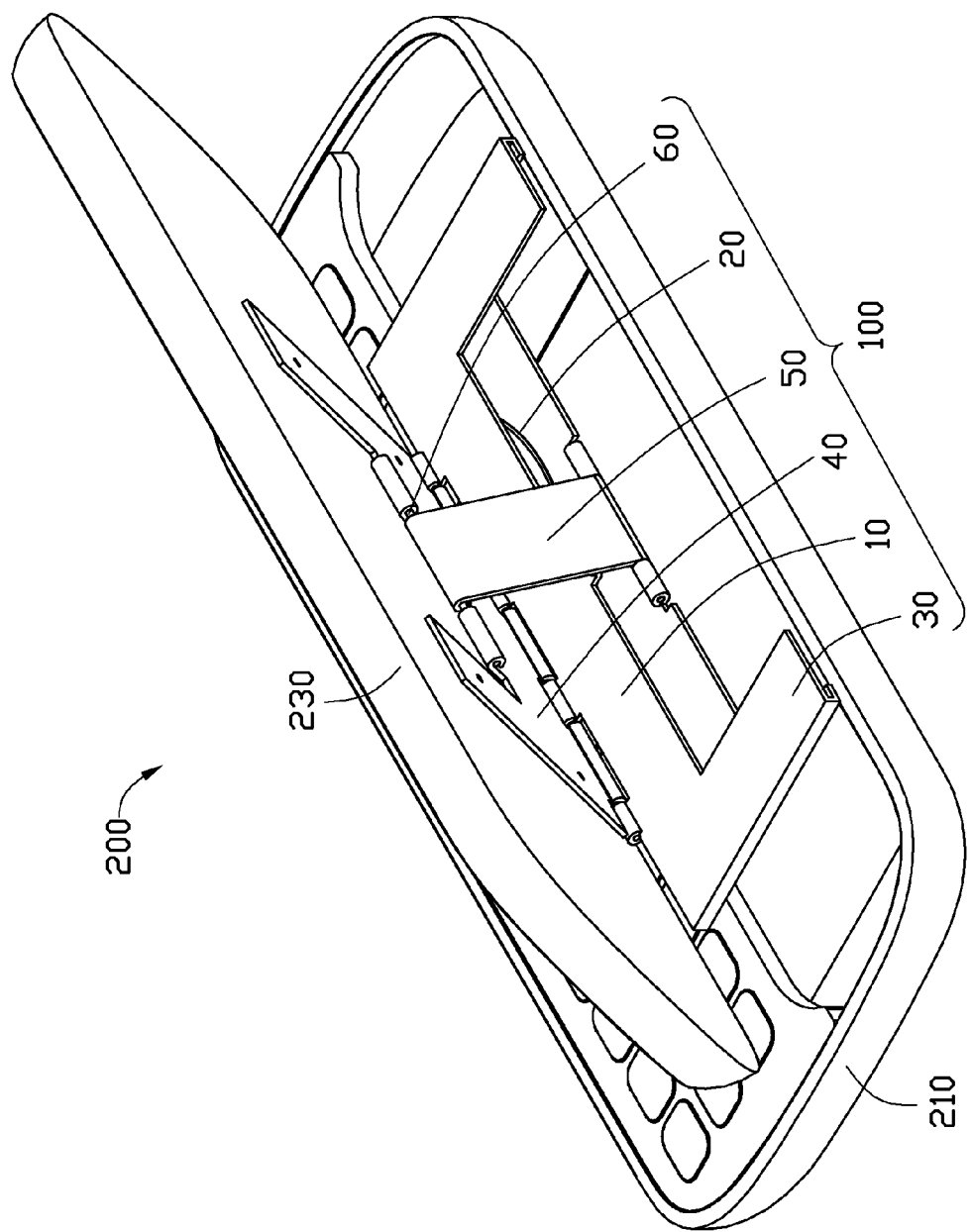
FIG. 4 shows an assembled perspective view of the portable electronic device shown in FIG. 3, in an open configuration.
Figure 5:
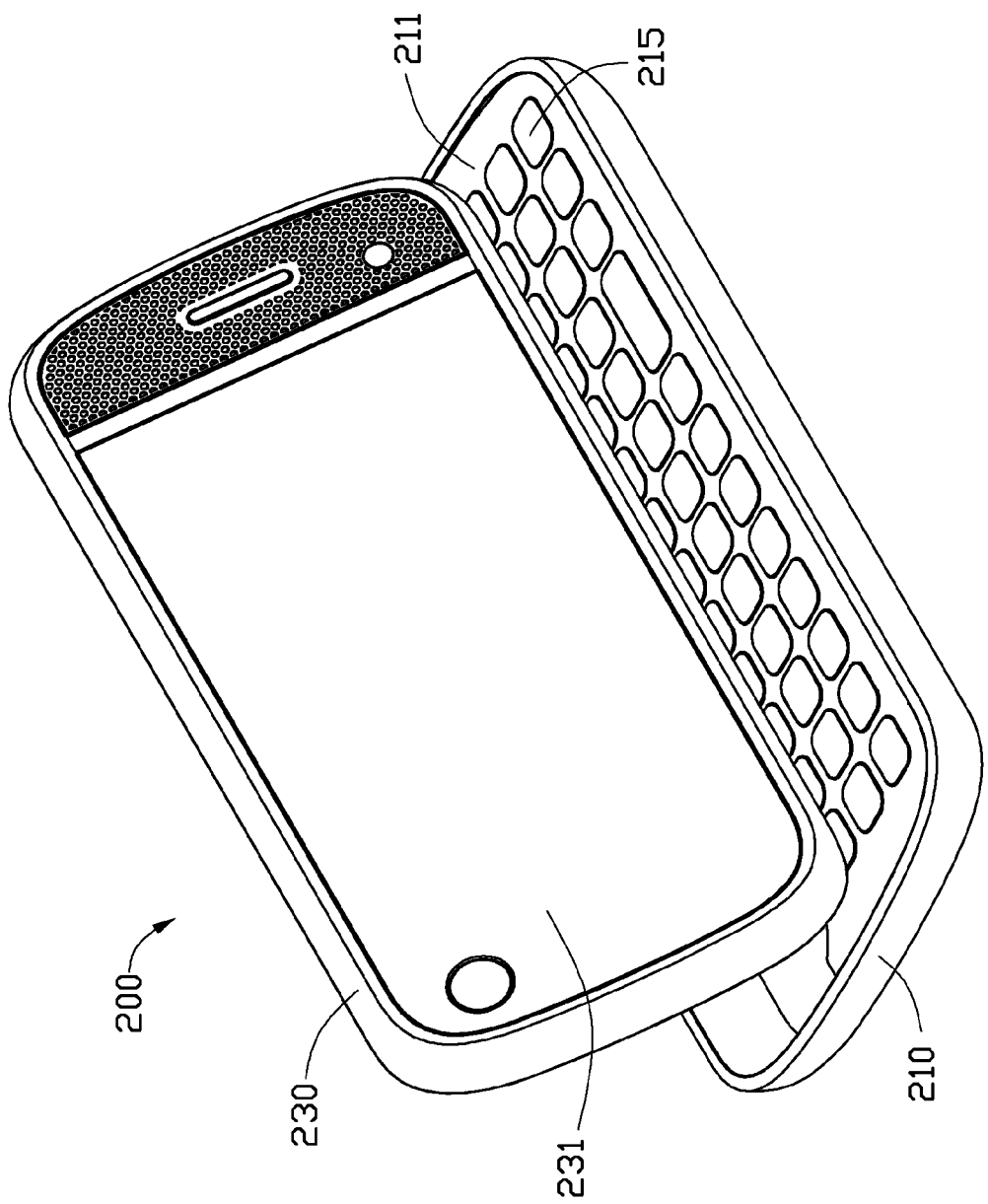
FIG. 5 is similar to FIG. 4, but viewed from another aspect.

FIG. 1 and FIG. 4 show an exemplary embodiment of a portable electronic device 200 including a base body 210, a cover body 230, and a sliding mechanism 100 slidably coupling the base body 210 to the cover body 230. The base body 210 includes a housing 211 and a key board 213 mounted on the housing 211. The key board 213 includes a plurality of keys 215 disposed thereon. The cover body 230 includes a display 231. Referring to FIG. 3, in the closed configuration, the cover body 230 lies upon the base body 210, and both the base body 210 and the cover body 230 are coplanar and adjacent to each other. As shown in FIG. 4 and FIG. 5, in the opened configuration, the cover body 230 is slid relative to the base body 210 along the 'A' direction shown in FIG. 3 to expose the keys 215 of the key board 213. The cover body 230 is laterally offset from the base body 210 and forms an obtuse angle relative to the base body 210 for providing a user with a comfortable viewing angle.

Figure 2:
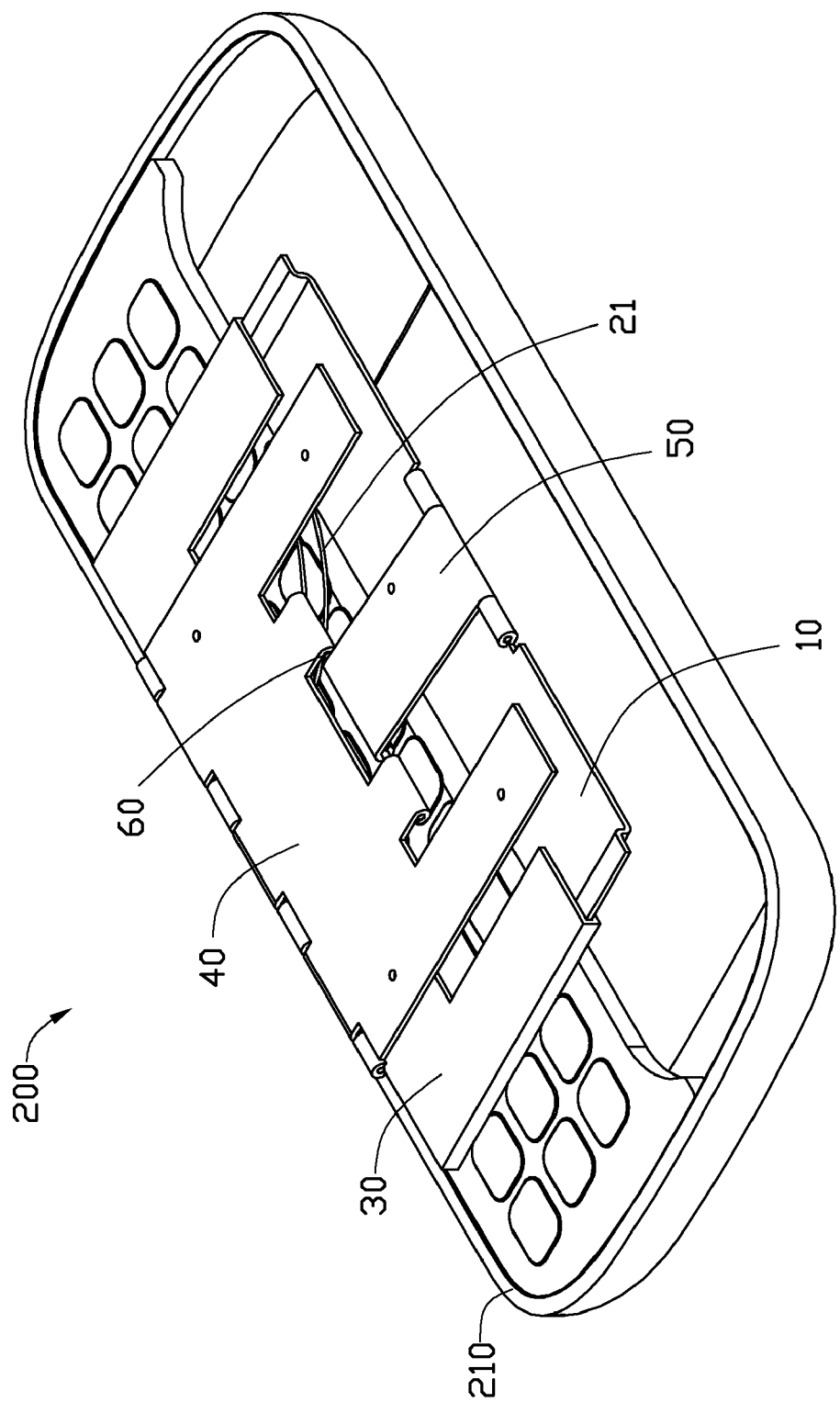
FIG. 2 shows a partially assembled view of the portable electronic device shown in FIG. 1.

Also referring to FIG. 2, the sliding mechanism 100 includes a base plate 10, an elastic assembly 20, a sliding plate 30, a connecting plate 40, a support plate 50, and three connecting pins 60. The sliding plate 30 is slidably assembled to the base plate 10 and is located upon the base plate 10. The connecting plate 40 is hinged to the sliding plate 30 around one connecting pin 60 and is positioned above the corresponding sliding plate 30 when in the closed configuration. The support plate 50 is coupled with the connecting plate 40 and the base plate 10, and overlaps upon the base plate 10 when in the closed configuration. The two ends of the support plate 50 are rotatably hinged to the connecting plate 40 and the base plate 10 around the two connecting pins 60.

The base plate 10 includes two guiding rails 11 at two opposite ends. The two guiding rails 11 longitudinally extend from opposite ends of the base plate 10, substantially perpendicular to the base plate 10 and deformed to the base plate 10. Two first pin barrels 13 are spaced at one side of the middle portion of the base plate 10, thereby forming a first coupling gap 15 between the two first pin barrels 13. The two first pin barrels 13 rotatably connect the base plate 10 with the support plate 50 around the connecting pin 60 shown in FIG. 4. The base plate 10 defines a through assembling hole 17.

The elastic assembly 20 may include two arcuate band springs 21 with different radius of curvature and two connecting posts 25. Each end of each band spring 21 is curved to form a ring shaped connecting end 23. The two arcuate band springs 21 are assembled as a whole by the two connecting posts 25 to form the substantially closed arcuate elastic assembly 20. One end of the elastic assembly 20 is coupled to the base plate 10 with one corresponding connecting post 25 inserting and being fixed to the assembling hole 17 of the base plate 10. The opposite end of the elastic assembly 20 is secured to the sliding plate 30.

The sliding plate 30 is substantially U-shaped and includes a hinged portion 31 and two sliding portions 33 substantially perpendicularly extending from opposite ends of the hinged portion 31. The hinged portion 31 includes spaced second pin barrels 311 away from the two sliding portions 33, thereby forming hinged gaps 312 therebetween. The hinged portion 31 is rotatably connected with the connecting plate 40 around the connecting pin 60. A resisting block 313 protrudes from the substantially middle portion of the opposite side of the hinged portion 31 toward the two sliding portions 33 for resisting against the connecting plate 40. A mounting hole 315 is defined through the hinged portion 31 adjacent to the resisting block 313 and assembled with the corresponding other end of the elastic assembly 20. The elastic assembly 20 is elastically held between the base plate 10 and the sliding plate 30 when the sliding mechanism 100 in the closed configuration shown in FIG. 2. Two opposite sliding slots 331 are respectively defined in the two sliding portions 33 corresponding to the two guiding rails 11 of the base plate 10, such that, the base plate 10 can be slidably assembled with the sliding plate 30.

The connecting plate 40 is substantially U-shaped and includes a coupling portion 41 and fixing portions 43 extending substantially perpendicularly from each end of the coupling portion 41. The coupling portion 41 includes spaced third pin barrels 411 on one side, and away from the two fixing portions 43 corresponding to the hinged gaps 312. The coupling portion 41 is hinged to the hinged portion 31 with the third pin barrels 411 engaging with the corresponding hinged gaps 312 about the connecting pin 60. Two hinged barrels 413 are spaced on the other side of the coupling portion 41 opposite to the hinged barrels 41 and toward the two fixing portions 43. The two hinged barrels 413 are located between the two fixing portions 43, thereby forming a second coupling gap 415 therebetween.

The support plate 50 couples with the base plate 10 and the connecting plate 40. Two ends of the support plate 50 form coupling barrels 51 corresponding to the first coupling gap 15 of the base plate 10 and the second coupling gap 415 of the connecting plate 40. The two ends of the support plate 50 are rotatably connected respectively with the two hinged barrels 413 of the connecting plate 40 and two first pin barrels 13 of the base plate 10 around two connecting pins 60.

Referring to FIGS. 1 to 3, when assembling the sliding mechanism 100, the two ends of the elastic assembly 20 are respectively fixed to the assembling hole 17 of the base plate 10 and the mounting hole 315 of the sliding plate 30 by the two connecting posts 25. The two guiding rails 11 of the base plate 10 slidably engage respectively within the corresponding two sliding slots 331 of the sliding plate 30. The third pin barrels 411 of the coupling portion 41 of the connecting plate 40 engage and align with the corresponding second pin barrels 311 of the hinged portion 31 of the sliding plate 30. One pin 60 passes through the corresponding second pin barrels 311 and the third pin barrels 411 to rotatably hinge the connecting plate 40 to the sliding plate 30. One end of the support plate 50 engages within the second coupling gap 415 of the connecting plate 40 and aligns with the two hinged barrels 413, one connecting pin 60 passes through the two hinged barrels 413 and the coupling barrel 51 of the support plate 50 to rotatably hinge the support plate 50 to the connecting plate 40. The other end of the support plate 50 engages within the second coupling gap 415 of the connecting plate 40 and aligns with the two first pin barrels 13. One connecting pin 60 passes through the two first pin barrels 413 and the other coupling barrel 51 of the support plate 50 to rotatably hinge the support plate 50 to the base plate 10, and then the sliding mechanism 100 is assembled. When assembling the portable electronic device 200, the base body 210 is fixed to the base plate 10 of the sliding mechanism 100, the cover body 230 is fixed to the fixing portions 43 of the connecting plate 40.

Referring again to FIGS. 3 to 5, in use, the cover body 230 is slid relative to the base body 210 along the arrow A from the closed configuration shown in FIG. 3 to an opened configuration shown in FIG. 4, to expose the keys 215 of the base body 210. During this process, the cover body 230 and the connecting plate 40 slide substantially parallel to the base body 210, and the connecting plate 40 overlaps with the sliding plate 30 sliding relative to the base plate 10 to compress the elastic assembly 20. When the keys 215 of the base body 210 are completely exposed, the cover body 230 and the connecting plate 40 are lifted upward away from the base body 210, urging the connecting plate 40 to rotate relative to the support plate 50 and the sliding plate 30. The cover body 230 forms an obtuse angle relative to the base body 210. The user can conveniently operate the keys 215 with a comfortable viewing angle of the display 231. When closing the cover body 230, the cover body 230 is operated in reverse to the previously mentioned operating steps, as the cover body 230 is closed completely and positioned upon the base body 210, the resisting block 313 resists against the connecting plate 40 to prevent the cover body 230 from automatically sliding relative to the base body 210.

It is to be further understood that even though numerous characteristics and advantages of the exemplary embodiments have been set forth in the foregoing description, together with details of structures and functions of various embodiments, the disclosure is illustrative only, and changes may be made in detail, especially in matters of shape, size, and arrangement of parts within the principles of the exemplary invention to the full extent indicated by the broad general meaning of the terms in which the appended claims are expressed.

What is claimed is:

1. A sliding mechanism, comprising:
   a base plate;
   a sliding plate slidably assembled with the base plate and located upon the base plate;
   a connecting plate hinged to the sliding plate and configured to be located above the corresponding sliding plate when in a closed configuration and be rotated to form an angle with the sliding plate;
   a support plate with two ends thereof rotatably coupling with the connecting plate and the base plate respectively, the support plate configured to be operatably lied on the base plate when in a closed configuration and form an angle with the base plate to support the corresponding connecting plate; and
   an elastic assembly elastically held between the base plate and the sliding plate to exert a force on the sliding plate and the base plate, causing the sliding plate to slide along two guiding rails of the base plate, wherein the elastic assembly includes two arcuate band springs with different radius of curvature, the two arcuate band springs assembled together to form a closed arcuate elastic assembly, and the two ends of the elastic assembly respectively coupled to the base plate and the sliding plate.

2. The sliding mechanism as claimed in claim 1, wherein the base plate includes the two guiding rails formed at two opposite ends thereof respectively; the sliding plate defines two opposite sliding slots corresponding to and engaging with the two guiding rails of the base plate respectively.

3. The sliding mechanism as claimed in claim 2, wherein the base plate defines an assembling hole therethrough, and the sliding plate defines a mounting hole therethrough; the ends of each band spring are curled to form a ring shaped connecting end; the elastic assembly further includes two connecting posts respectively penetrating the corresponding two connecting ends of the spring and fixed to the corresponding assembling hole of the base plate and the mounting hole of the sliding plate.

4. The sliding mechanism as claimed in claim 1, wherein the base plate includes two first pin barrels spaced disposed at one side thereof and thereby forming a first coupling gap between the two first pin barrels; the support plate includes a coupling barrel formed at one end thereof corresponding to the first coupling gap of the base plate, the pin barrel of the support plate engages within the coupling gap and aligns with the two first pin barrels such that, the support plate are respectively rotatably hinged with the base plate by one connecting pin.

5. The sliding mechanism as claimed in claim 4, wherein the sliding plate includes several second pin barrels spaced disposed on a hinged portion thereof and thereby forming several hinged gaps therebetween; the connecting plate includes several third pin barrels spaced disposed on one side thereof and configured for engaging with the corresponding hinged gaps of the sliding plate; such that, the sliding plate is hinged to the connecting plate by a connecting pin.

6. The sliding mechanism as claimed in claim 5, wherein the connecting plate further includes two hinged spaced barrels formed on the opposite other side of the coupling portion to the hinged barrels and thereby forming a second coupling gap therebetween; the support plate further includes another coupling barrel formed at the other end thereof, and configured to engage within the second coupling gap and align with the two hinged barrels; a connecting pin penetrate through the two hinged barrels and the coupling barrel to hinge the support plate to the connecting plate.

7. The sliding mechanism as claimed in claim 1, wherein the sliding plate includes a resisting block protruding therefrom and configured to resist against the connecting plate and prevent the connecting plate running away from the sliding plate freely.

8. A portable electronic device, comprising:
  a base body;
  a cover body; and
  a sliding mechanism slidably connected between the base body and the cover body;
  the sliding mechanism, comprising:
  a base plate fixed to the base body;
  a sliding plate slidably assembled with the base plate, and located upon the base plate;
  a connecting plate hinged to the sliding plate and fixed with the corresponding cover body;
  the connecting plate configured to be located above the corresponding sliding plate when in a closed configuration and be rotated together with the cover body to form an angle with the sliding plate;
  a support plate with two ends thereof rotatably coupling with the connecting plate and the base plate respectively, the support plate configured to be operably lied on the base plate when in a closed configuration and form an angle with the base plate to support the corresponding connecting plate and the cover body; and
  an elastic assembly elastically held between the base plate and the sliding plate to exert a force on the sliding plate and the base plate, causing the sliding plate to slide along two guiding rails of the base plate, wherein the elastic assembly includes two arcuate band springs with different radius of curvature, the two arcuate band springs assembled together to form a closed arcuate elastic assembly, and the two ends of the elastic assembly respectively coupled to the base plate and the sliding plate.

9. The portable electronic device as claimed in claim 8, wherein the base plate includes the two guiding rails formed at opposite ends thereof; the sliding plate defines two opposite sliding slots corresponding to and engaging with the two guiding rails of the base plate respectively.

10. The portable electronic device as claimed in claim 8, wherein the base body includes a key board having keys disposed thereon, the cover body includes a display disposed thereon; the key board hides under the cover body when the portable electronic device is in a closed configuration and is exposed when the portable electronic device is in an opened configuration.

11. The portable electronic device as claimed in claim 9, wherein the base plate defines an assembling hole therethrough, and the sliding plate defines a mounting hole therethrough; each end of each band spring are respectively curled to form a ring shaped connecting end; the elastic assembly further includes two connecting posts respectively penetrating the corresponding two connecting ends of the spring and fixed to the corresponding assembling hole of the base plate and the mounting hole of the sliding plate.

* * * * *